United States Patent
Bomer et al.

(10) Patent No.: US 7,441,036 B2
(45) Date of Patent: Oct. 21, 2008

(54) METHOD AND SYSTEM FOR A DEBUGGING UTILITY BASED ON A TCP TUNNEL

(75) Inventors: Staton Thomas Bomer, Austin, TX (US); Bernardo Margolis, Cedar Park, TX (US); Saju Mathew, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 10/405,401

(22) Filed: Apr. 1, 2003

(65) Prior Publication Data

US 2004/0199629 A1    Oct. 7, 2004

(51) Int. Cl.
*G06F 15/16* (2006.01)

(52) U.S. Cl. .................. 709/228; 709/203; 709/219; 709/221; 709/246

(58) Field of Classification Search .................. 709/203, 709/219, 221, 228, 246
See application file for complete search history.

(56) References Cited

U.S. PATENT DOCUMENTS

| | | | | |
|---|---|---|---|---|
| 6,003,084 A | * | 12/1999 | Green et al. | 709/227 |
| 6,085,243 A | * | 7/2000 | Fletcher et al. | 709/224 |
| 6,219,803 B1 | * | 4/2001 | Casella et al. | 714/38 |
| 6,411,998 B1 | | 6/2002 | Bryant et al. | 709/224 |

OTHER PUBLICATIONS

"What is TracePlus®/Web Detective?", Systems Software Technology, Inc., http://www.sstinc.com/webanal.html, Jan. 2003.
Dedieu et al., "Pluxy Developper Guide beta-4 release", http://webtools.dyade.fr/pluxy/docs/developperGuide.html, Mar. 1999.
"Anonymity 4 Proxy Support Pages", iNetPrivacy Software, http://inetprivacy.com/a4proxy/modify-http.htm, Jan. 2002.
@stake® WebProxy™ 2.0, no date, Mar. 30, 2003.
"About WebProxy", @stake®, http://atstake.com/webproxy/, Jan. 2003.
"Debugging SOAP Clients and Services", http://webreference.com/programming/java/webservices/chap3/5/6.html, Jun. 17, 2002.
"Using NetTool", CapeScience, http://capescience.capeclear.com/articles/using_nettool/, Mar. 27, 2002.
"Network Software", http://www.steelbytes.com/software_network.html, Jun. 6, 2002.
"TCP Tunnel v2.0", Sureshot Software, http://www.bysoft.se/sureshot/tcptunnel/index.html, no date given, Jun. 29, 2001.
"HTTP-Tunnel Client", http://http-tunnel.com/HT_Products_HTTPTunnelClient.asp, Jan. 9, 2002.

* cited by examiner

*Primary Examiner*—Phuoc H Nguyen
(74) *Attorney, Agent, or Firm*—Hamilton & Terrile, LLP; Stephen A. Terrile

(57) ABSTRACT

A software development and debugging tool is based upon a TCP (Transport Control Protocol) tunnel. The TCP tunnel operates independently without a requirement of pre-configuring a client application or a server application to interoperate with the TCP-tunnel-based debugging utility. Various content-related tests can be performed by modifying the client-generated request messages at the TCP tunnel. Various timing-related tests can be performed by delaying the client-generated requests and/or server-generated responses at the TCP tunnel.

1 Claim, 4 Drawing Sheets

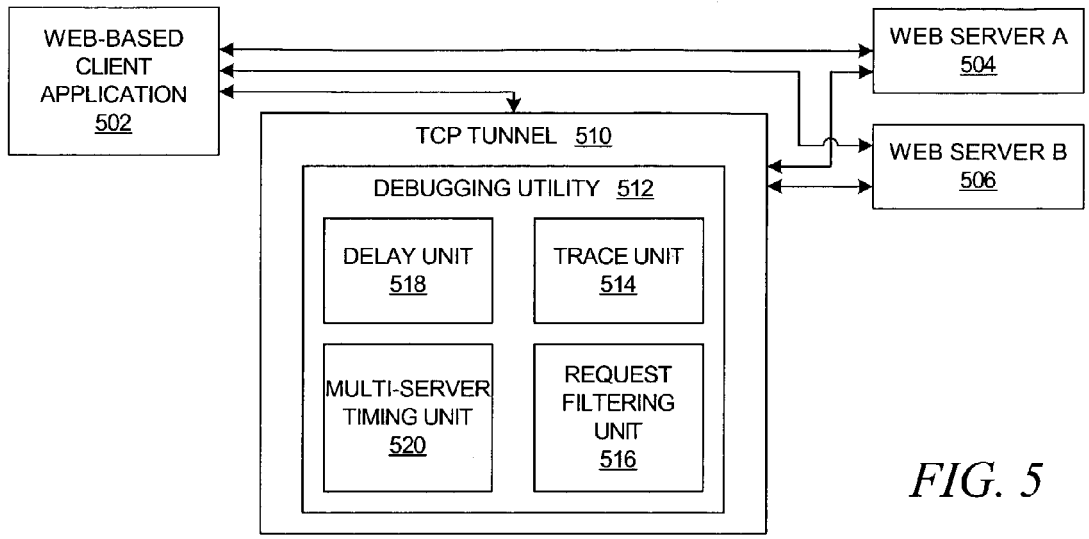
FIG. 5
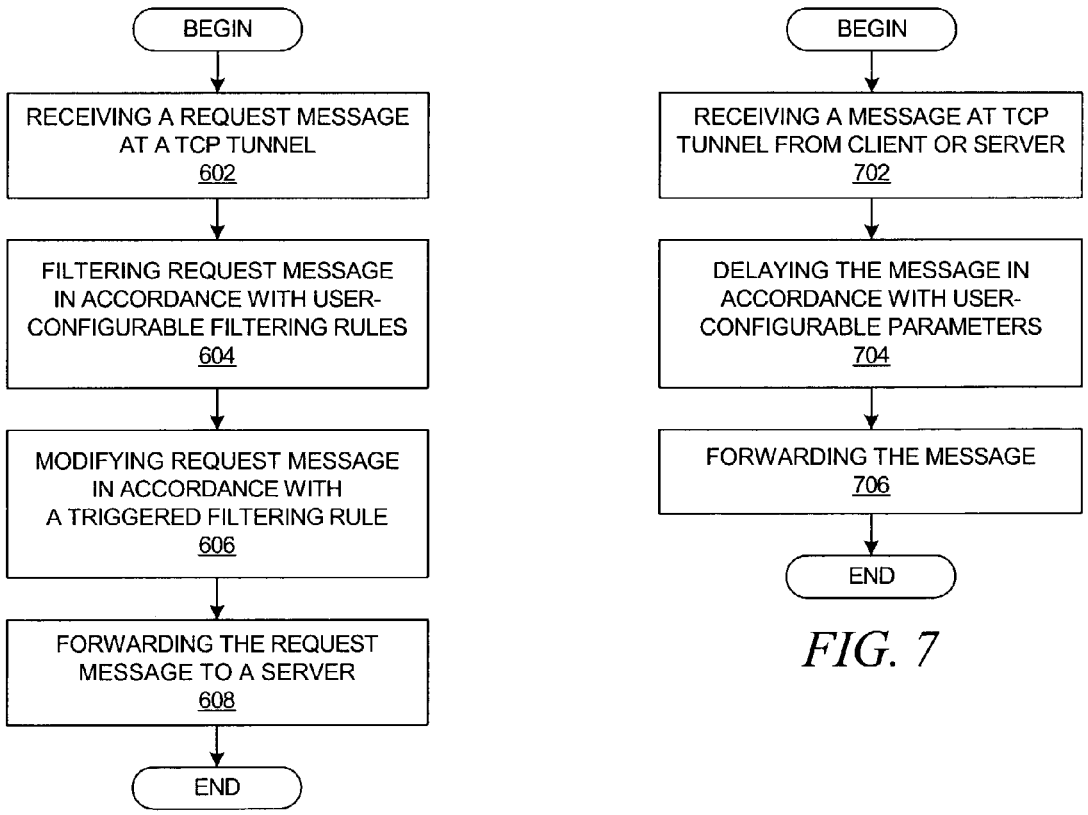
FIG. 6
FIG. 7

METHOD AND SYSTEM FOR A DEBUGGING UTILITY BASED ON A TCP TUNNEL

BACKGROUND OF THE INVENTION

1. Field of the Invention

The present invention relates to an improved data processing system and, in particular, to a method and apparatus for improving system performance in a data processing system. Still more particularly, the present invention provides a method and apparatus for a software program development and debugging tool for software applications.

2. Description of Related Art

During the development of a software application, software engineers often have a need to debug the software application through a variety of software development tools. During the development of a Web client application or a Web server application, there is a particular need to debug the network traffic.

There are many commercially available software application development tools that provide Web-based debugging functionality through proxy servers. Client applications must be configured to operate through a proxy server, however, so a client application that is being debugged through a proxy server does not operate in a truly independent manner like a fully-developed, production-level application. Therefore, it would be advantageous to provide an independent debugging utility that does not require prior configuration of the application that is to be debugged.

SUMMARY OF THE INVENTION

Various methods, apparatuses, systems, or computer program products are presented for debugging applications through a debugging utility. A first embodiment processes a request message that is received from a client at a TCP (Transport Control Protocol) tunnel, and the request message is modified at the TCP tunnel in accordance with user-configurable filtering rules. The modified request message is then forwarded from the TCP tunnel to a server. A second embodiment processes a message that is received at a TCP tunnel from either a client or a server, and the message is delayed at the TCP tunnel for a configurable or computable time period before forwarding the message from the TCP tunnel. A third embodiment processes a request message that is received from a client at a TCP tunnel, and multiple copies of the request message are generated at the TCP tunnel. A copy of the request message is forwarded from the TCP tunnel to a server such that the multiple copies are forwarded to a unique server in a set of servers. A response message is received at the TCP tunnel from each server in the set of servers, and a response time is computed at the TCP tunnel for each server in the set of servers.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 5 depicts a block diagram that shows a TCP-tunnel-based debugging utility in accordance with an embodiment of the present invention;

FIG. 6 depicts a flowchart that shows a process for filtering and modifying request messages within a TCP-tunnel-based debugging utility in accordance with an embodiment of the present invention;

FIG. 7 depicts a flowchart that shows a process for delaying messages within a TCP-tunnel-based debugging utility in accordance with an embodiment of the present invention.

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
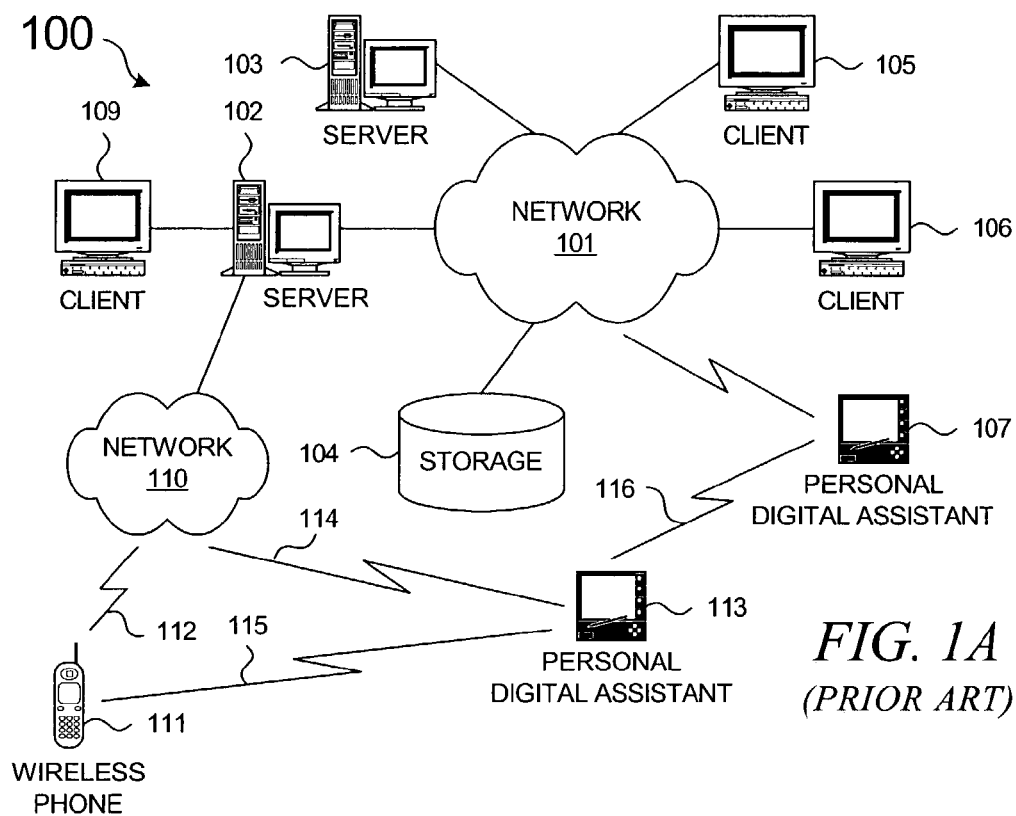
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), Common Presence and Instant Messaging (CPIM) protocols, etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
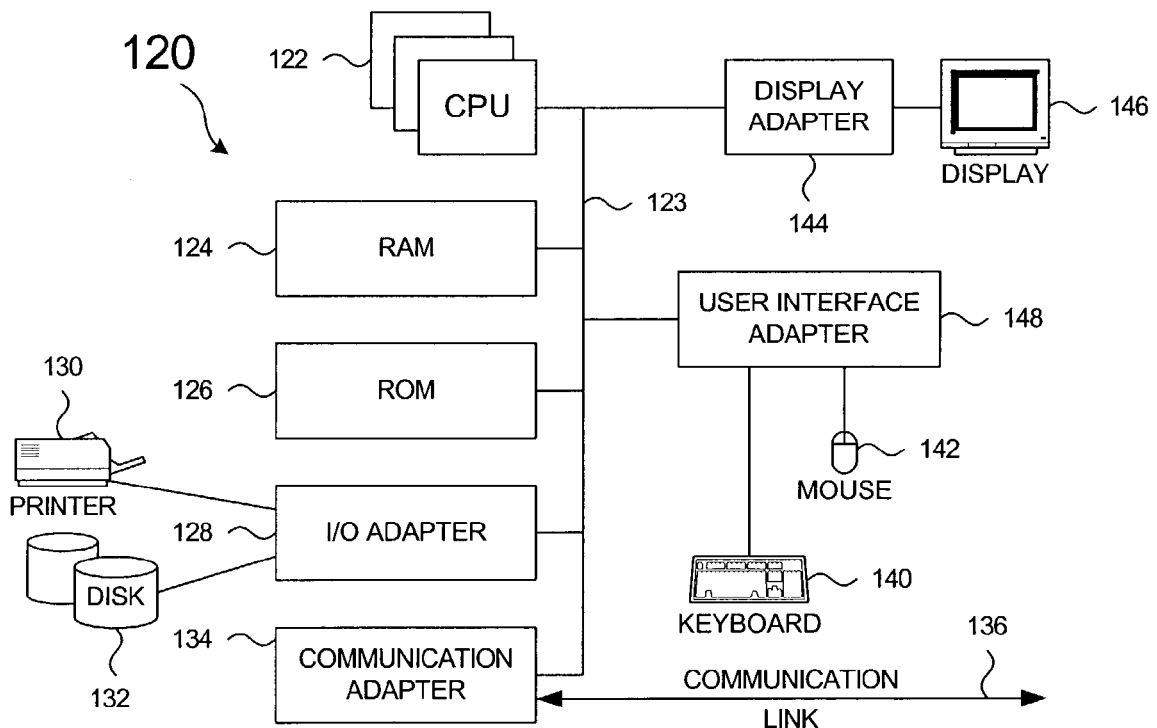
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to a Web-based software development and debugging utility that may be operated in a truly independent manner such that the debugging utility does not require prior configuration of a client application or server application that is being debugged. The present invention is based on a novel recognition that a TCP tunnel can be used as the basis for a truly independent debugging utility for Web-based applications, whereas prior art debugging utilities for Web-based applications are based on proxy servers. Prior to discussing the present invention in more detail, some operational details of a typical Web proxy and a typical TCP tunnel are compared.

Figure 2:
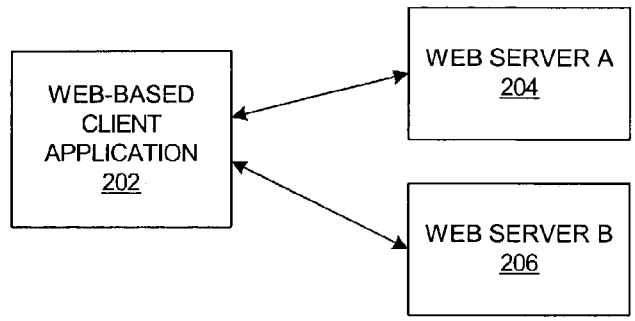
FIG. 2 depicts a block diagram that shows a typical Web-based client-server architecture.

With reference now to FIG. 2, a block diagram depicts a typical Web-based client-server architecture. Web-based client application 202 sends request messages and receives response messages to/from web servers 204 and 206. The message traffic may be formatted and controlled in accordance with a variety of well-known protocols through a variety of different network configurations in the manner described above for FIG. 1A. In this example, the message traffic is transferred through the network directly between the client and the servers.

Figure 3:
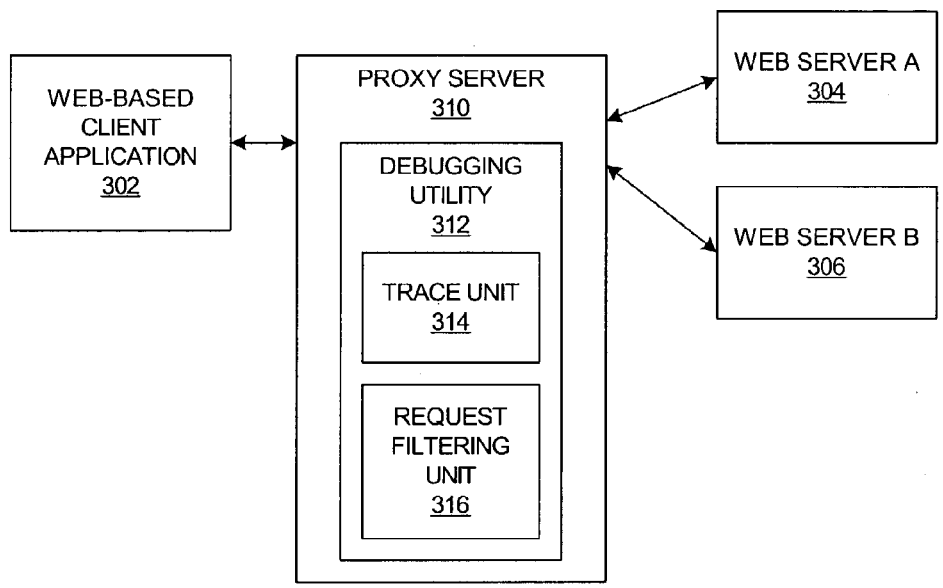
FIG. 3 depicts a block diagram that shows a typical proxy-server-based debugging utility.

With reference now to FIG. 3, a block diagram depicts a typical proxy-server-based debugging utility. In a manner similar to FIG. 2, Web-based client application 302 sends request messages and receives response messages to/from web servers 304 and 306. However, in contrast to FIG. 2, proxy server 310 acts as an intermediate agent for client 302. Client 302 is configured to send all message traffic through proxy server 310 for one or more specific networking protocols. Multiple proxy servers may be chained together when a proxy server is likewise configured to send message traffic to another proxy server. Proxy server 310 may be an HTTP proxy, an FTP proxy, or some other type of proxy that handles message traffic formatted in accordance with one or more TCP-related protocols. For example, client 302 may be a browser that operates in a well known manner by allowing the user to enter an IP address and port number for an HTTP proxy server into the configurable parameters of the browser application; subsequently, client 302 sends all HTTP requests to the configured proxy server rather than directly to an IP address associated with a URL (Uniform Resource Locator), or more generally, a URI (Uniform Resource Locator), in the HTTP requests after a DNS (Domain Name System) lookup operation. After receiving an HTTP request; an HTTP proxy server would forward the HTTP request in an appropriate manner after performing some type of processing. In the example shown in FIG. 3, proxy server 310 incorporates proxy-based debugging utility 312, which comprises trace unit 314 that allows message traffic to be traced to a log file and request filtering unit 316 that allows request messages to be filtered with reference to configurable filtering rules.

Figure 4:
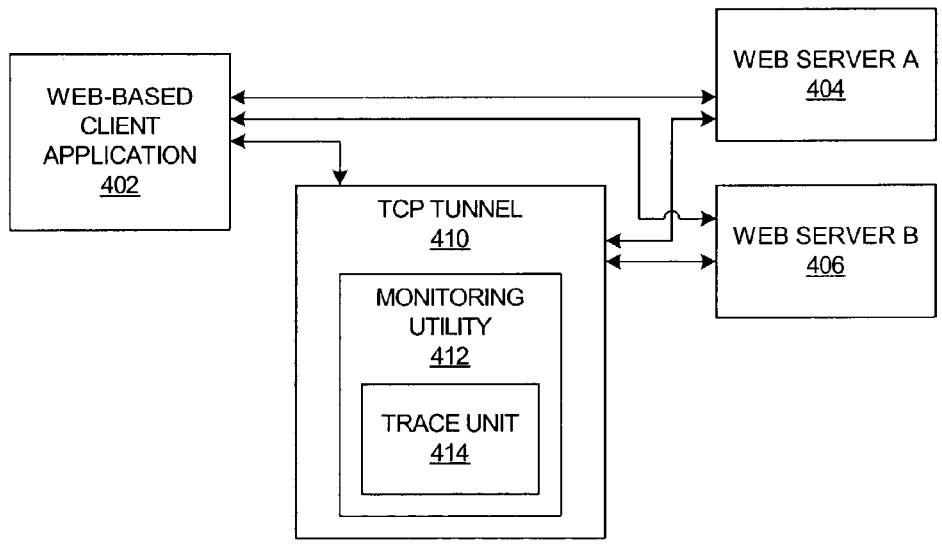
FIG. 4 depicts a block diagram that shows a typical TCP-tunnel-based monitoring utility.

With reference now to FIG. 4, a block diagram depicts a typical TCP-tunnel-based monitoring utility. In a manner similar to FIG. 2, Web-based client application 402 sends request messages and receives response messages to/from web servers 404 and 406. However, in contrast to FIG. 2, TCP tunnel 410 may act as an intermediate agent for client 402. In this example, the message traffic to/from the client may be transferred through the network directly between the client and the servers or through the TCP tunnel that acts as an intermediate agent. The destination of a request from the client depends on the URI that is entered into the client or that is generated by the client and then placed into the request message. In FIG. 3, the client is configured to send all requests through the proxy server, which then routes the request using DNS lookup operations and servers if necessary. In contrast, the client in FIG. 4 routes the requests as necessary, possibly using DNS lookup operations and servers.

The message traffic through the TCP tunnel may be formatted and controlled in accordance with a variety of well-known protocols through a variety of different network configurations in the manner described above for FIG. 1A as long as the message traffic is based on a TCP-related protocol, such as HTTP, FTP, etc. In a well-known manner, TCP tunnel 410 may be configured through monitoring utility 412, which comprises trace unit 414 that allows incoming and outgoing message traffic to be traced to a log file. Monitoring utility 412 may be configured through configuration files or through an interactive user interface.

TCP tunnel 410 operates in a well-known fashion. Using an appropriate configuration utility or configuration file for the TCP tunnel, a user may specify an input port number to be associated with a destination host address or a destination URI along with a port number of the destination host. The association between the input port number and the destination address/port number is a routing or a mapping between the input and the output at the TCP tunnel. Requests that are received by the TCP tunnel on the input port are forwarded using the destination host address and port number such that the TCP tunnel routes TCP-based messages. In this manner, the TCP tunnel is said to "tunnel" through firewalls that block requests on certain ports since the TCP tunnel can change the destination port number from the originally requested port number in the original request from the client, which likely generated its request using standardized port numbers. TCP tunnels may be chained together to route messages through multiple systems.

A TCP tunnel is a truly independent entity that acts an intermediate agent between a client and a server only when the client sends request messages to it. The client sends requests to a destination host; the client may not be aware that the destination host is actually operating as a TCP tunnel, yet the client does not require any configuration to interact with a TCP tunnel as was noted above for causing a client to interact with a proxy server. A TCP tunnel is configured to listen to incoming requests on one or more port numbers; anything that is received on a particular port number is mapped and forwarded to a different target server at a particular (usually different) port number. For example, if the client sends a particular protocol request (e.g., HTTP request to URI=www-132.ibm.com; an HTTP request is on port 80 by default), then the client uses typical DNS lookup operations to route the request to the proper machine supporting the requested URI ("www-132.ibm.com"). If the destination host is configured as a TCP tunnel, then it forwards the request to a different host at a different port number as determined within its configuration information. However, the client is free to send requests to other domains, and the client may not be aware of the rerouting that is performed by the TCP tunnel.

With reference now to FIG. 5, a block diagram depicts a TCP-tunnel-based debugging utility in accordance with an embodiment of the present invention. In a manner similar to FIG. 4, Web-based client application 502 sends request messages and receives response messages to/from web servers 504 and 506. TCP tunnel 510 may act as an intermediate agent for client 502. In contrast to FIG. 4, TCP tunnel 510 incorporates debugging utility 512, which comprises trace unit 514 that allows incoming and outgoing message traffic to be traced to a log file. Debugging utility 512 may be configured through configuration files or through an interactive user interface.

Debugging utility 512 also incorporates request filtering unit 516 that allows request messages to be filtered with reference to configurable filtering rules. The filtering rules may be retrieved from a configuration file or interactively entered by a user through a user interface. The filtering rules may be based on a set of regular expressions in which a request message is parsed and interpreted based on a comparison of portions of its content against variable expressions for that content, and the modifications may be based on regular expression substitution in which various parameters in the request message are replaced by configurable parameters in the debugging utility. The modifications may be made to URIs, parameters within URIs, message headers, form fields, content bodies, or any other part of the filtered request messages. By varying the requests from a client independently after the client application has generated the request messages, the client application does not have to be changed or instrumented to generate request messages having particular data that assists in a debugging operation.

In addition, debugging utility 512 incorporates delay unit 518 for injecting delay periods into the transfer of messages through the TCP tunnel. By introducing delay into the message traffic, the debugging utility assists in discovering and correcting timing-related problems that may exist in a client application or a server application.

Furthermore, debugging utility 512 incorporates multi-server timing unit 520. By comparing the response times of multiple servers, the debugging utility may assist in discovering performance problems with different server installations and configurations.

With reference now to FIG. 6, a flowchart depicts a process for filtering and modifying request messages within a TCP-tunnel-based debugging utility in accordance with an embodiment of the present invention. The process begins when a request message is received by a debugging utility in a TCP tunnel (step 602). The TCP tunnel then filters the request message in accordance with a set of user-configurable filtering rules (step 604), and the request message is modified in accordance with any filtering rules that are triggered (step 606). The modified request message is then forwarded to the server (step 608), and the process is concluded. Each modification may be logged in a historical record, and each successive modification may be determined based on previous modifications as indicated in the historical records such that the modifications change over time.

With reference now to FIG. 7, a flowchart depicts a process for delaying messages within a TCP-tunnel-based debugging utility in accordance with an embodiment of the present invention. The process begins when an incoming message is received by a debugging utility in a TCP tunnel (step 702). The message may be either a request message from a client or a response message from a server. The message is then held at the TCP tunnel to inject a delay period into the message's transmission in accordance with user-configurable parameters and/or rules (step 704), after which the message is forwarded by the TCP tunnel (step 706), and the process is concluded. The delay period may be performed in an asynchronous manner through the use of a software timer; the expiration of the software timer would trigger the debugging utility to initiate the forwarding operation. The delay period may be retrieved or computed from user-configurable parameters and/or other information; for example, if the incoming message contains certain content as determined after a form of parsing operation or interpretation operation on the incoming message in accordance with user-configurable templates or rules, then the debugging utility determines an appropriate delay period and holds the message for that period. In addition, each delay period may be logged in a historical record, and the delay period may be computed based on previous delay periods as indicated in the historical records such that the delay period fluctuates over time.

Figure 8:
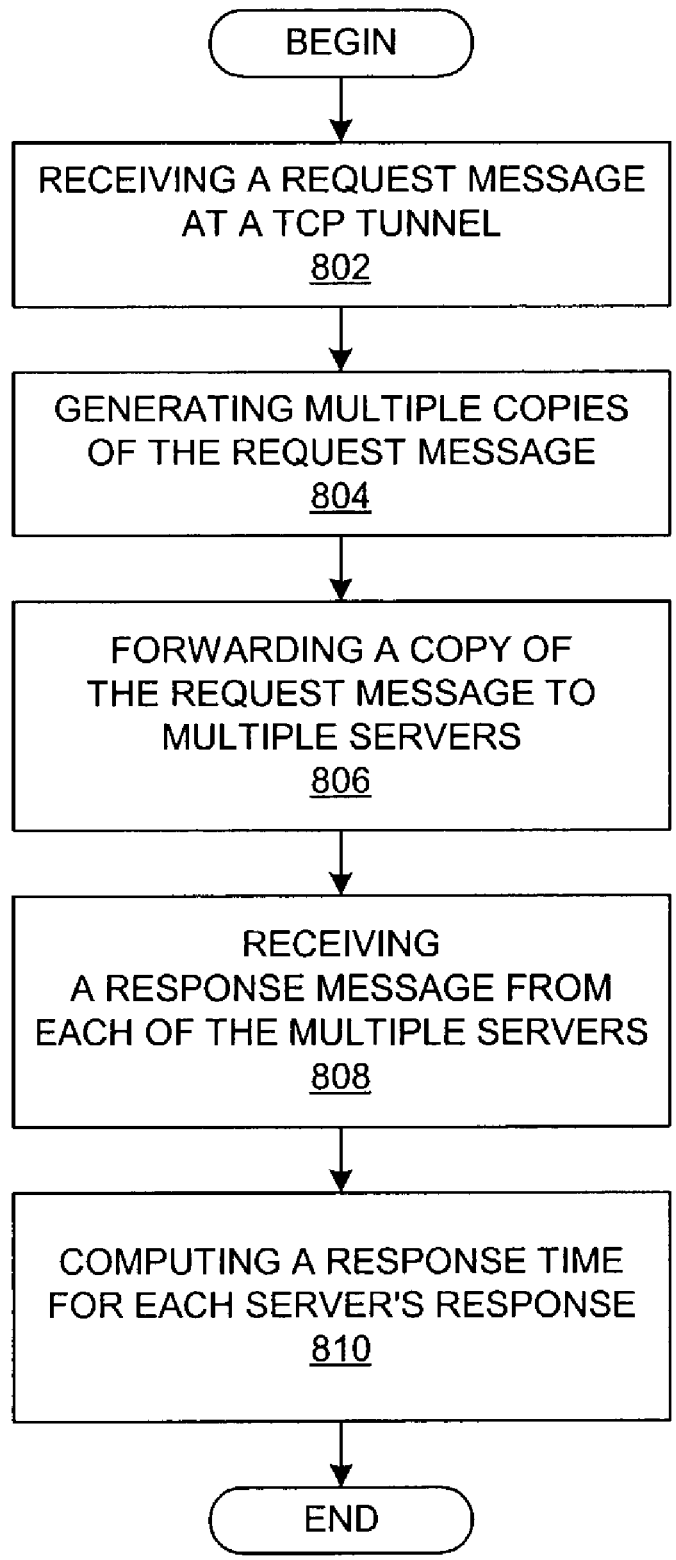
FIG. 8 depicts a flowchart that shows a process for timing responses from multiple servers within a TCP-tunnel-based debugging utility in accordance with an embodiment of the present invention.

With reference now to FIG. 8, a flowchart depicts a process for timing responses from multiple servers within a TCP-tunnel-based debugging utility in accordance with an embodiment of the present invention. The process begins when a request message is received by a debugging utility in a TCP tunnel (step 802). The TCP tunnel then generates multiple copies of the request message (step 804) and forwards them to multiple servers (step 806); one copy of the request message is forwarded to each server in a set of servers, wherein the identities of the servers in the set of servers is retrievable from configuration information for the TCP tunnel. At some subsequent point in time, a response message is received from each of the multiple servers (step 808), although there may be error responses or timeouts. A response time is computed for each server's response (step 810), and the process is concluded. A comparison of the response times may be presented within the debugging utility, and one of the responses may be chosen to be returned to the requesting client.

The advantages of the present invention should be apparent in view of the detailed description that is provided above. A Web-based debugging utility is based upon a TCP tunnel and operates independently without a requirement of pre-configuring a client application or a server application to interoperate with the Web-based debugging utility. Various changes can be made to client requests that are received at the TCP tunnel without the request modifications affecting all requests that might be generated by a client application since the client application is still free to generate requests that are not sent to the TCP tunnel. Various timing tests can be performed by the TCP tunnel without the timing tests affecting all requests that might be generated by a client application the client application is still free to generate requests that are not sent to the TCP tunnel.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for monitoring network messages from an application, the method comprising:

receiving a message at a TCP (Transport Control Protocol) tunnel, the message comprising a request message that is received from a client and forwarded to a server and a response message that is received from a server and forwarded to a client;

delaying the message at the TCP tunnel for a time period;

forwarding the message from the TCP tunnel in response to passage of the time period;

modifying the request message at the TCP tunnel in accordance with user-configurable filtering rules;

forwarding the modified request message from the TCP tunnel to a server;

determining the time period based upon user-configurable parameters and a history of delay operations on previous request messages such that delays vary over time; and, determining a modification based on a history of modification operations on previous request messages such that modifications vary over time.

\* \* \* \* \*